United States Patent
Kolinummi et al.

(10) Patent No.: US 7,155,551 B2
(45) Date of Patent: *Dec. 26, 2006

(54) HARDWARE SEMAPHORE INTENDED FOR A MULTI-PROCESSOR SYSTEM

(75) Inventors: Pasi Kolinummi, Tampere (FI); Juhani Vehvilainen, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 11/416,956

(22) Filed: May 2, 2006

(65) Prior Publication Data
US 2006/0200609 A1  Sep. 7, 2006

Related U.S. Application Data

(63) Continuation of application No. 10/345,006, filed on Jan. 15, 2003, now Pat. No. 7,062,583.

(30) Foreign Application Priority Data

Feb. 4, 2002  (FI) ................................. 20020210

(51) Int. Cl.
*G06F 12/00* (2006.01)
(52) U.S. Cl. ..................................... 710/200
(58) Field of Classification Search ..................... None
See application file for complete search history.

(56) References Cited

U.S. PATENT DOCUMENTS

| | | | |
|---|---|---|---|
| 3,469,239 A | | 9/1969 | Richmond et al. |
| 4,574,350 A | * | 3/1986 | Starr .................. 710/200 |
| 5,050,072 A | | 9/1991 | Earnshaw et al. |
| 5,276,886 A | | 1/1994 | Dror |
| 5,432,929 A | * | 7/1995 | Escola et al. .................. 707/9 |
| 5,613,139 A | * | 3/1997 | Brady .................. 710/200 |
| 5,951,662 A | | 9/1999 | Tissot |
| 6,018,785 A | | 1/2000 | Wenninger |
| 6,029,190 A | * | 2/2000 | Oliver .................. 718/107 |
| 6,134,579 A | * | 10/2000 | Tavallaei et al. .................. 718/100 |
| 6,151,688 A | * | 11/2000 | Wipfel et al. .................. 714/48 |
| 6,237,019 B1 | * | 5/2001 | Ault et al. .................. 718/104 |
| 6,263,425 B1 | | 7/2001 | Falik |
| 6,473,849 B1 | * | 10/2002 | Keller et al. .................. 712/30 |
| 6,529,933 B1 | * | 3/2003 | Montgomery et al. ...... 718/102 |
| 6,529,983 B1 | * | 3/2003 | Marshall et al. ............ 710/200 |
| 6,560,627 B1 | * | 5/2003 | McDonald et al. ......... 718/103 |

(Continued)

FOREIGN PATENT DOCUMENTS

DE    19952716    5/2001

(Continued)

*Primary Examiner*—Rehana Perveen
*Assistant Examiner*—Nimesh G. Patel
(74) *Attorney, Agent, or Firm*—Alfred A. Fressola; Ware, Fressola, Van Der Sluys & Adolphson LLP

(57) ABSTRACT

The invention relates to a method in a hardware semaphore lock (L1–LN) intended for a multi-processor system, which semaphore lock (L1–LN) protects a shared resource (R1–RN) in connection with the system in such a way that only a process which has reserved the semaphore lock (L1–LN) and has thus become a holder of the lock, has access to use the resource protected by the lock. The semaphore lock (L1–LN) is reserved by a single read operation of a memory location representing the semaphore lock by the process software. The read operation returns to the process the number of vacant holder positions, i.e. keyholes vacant at the time of the reservation of the lock. The semaphore lock does not require the support of the system for atomic read/write operations.

16 Claims, 2 Drawing Sheets

U.S. PATENT DOCUMENTS

| | | | |
|---|---|---|---|
| 6,587,964 B1 * | 7/2003 | Brooks | 714/28 |
| 6,662,252 B1 * | 12/2003 | Marshall et al. | 710/200 |
| 6,748,470 B1 | 6/2004 | Goldick | |
| 6,795,901 B1 | 9/2004 | Florek et al. | |
| 2004/0221079 A1 | 11/2004 | Goldick | |

FOREIGN PATENT DOCUMENTS

| | | |
|---|---|---|
| EP | 0898227 | 2/1999 |
| EP | 0965919 | 12/1999 |
| GB | 2216306 | 10/1989 |

* cited by examiner

HARDWARE SEMAPHORE INTENDED FOR A MULTI-PROCESSOR SYSTEM

CROSS REFERENCE TO RELATED APPLICATIONS

This application is a continuation of U.S. patent application Ser. No. 10/345,006 filed on Jan. 15, 2003 now U.S. Pat. No. 7,062,583, and claims domestic priority to said application under 35 USC §120, which in turn claims priority under 35 USC §119 to Finnish Patent Application No. 20020210 filed on Feb. 4, 2002.

FIELD OF THE INVENTION

The invention relates to a method in a hardware-implemented semaphore lock intended for a multi-processor system. The invention also relates to a hardware semaphore lock implementing the method and to a hardware semaphore module.

BACKGROUND OF THE INVENTION

In multi-processor systems, several different processors can simultaneously use shared resources of a system, such as, for example, auxiliary devices belonging to the system. Such a situation involves parallel processes on the hardware level. On the software level, in turn, parallelism refers to a program or software, in which processes, which are run in parallel, deal with, for example, a common data structure to be maintained in a shared memory. In this case, the data structure represents a common resource in view of the software processes.

Although the implementation of the present invention is, as such, based on the hardware, its implementations are related, in a wider sense, to the parallelism of processes both on the hardware level and on the software level. The invention can thus be applied, for example, in so-called embedded systems, in which the implementation of a single process involves functions on both the hardware level and the software level in a seamless way.

A situation, in which two or more processes attempt to use the same common resource, is called a contention. Furthermore, a contention situation involves the concept of a critical region. In general, a critical region refers to such a part of the program code which must be run as an unbroken logical unit, i.e. an atomic operation.

The operation of operating systems in a contention situation should be foreseeable; in other words, they should have a way of processing the critical regions contained in the program code in a controlled manner. Operating systems, such as Linux and some Unix versions, which operate in a shared multi-processor environment, apply software kernel locks to secure that only one process at a time has access to a certain critical program code region. Linux applies two types of kernel locks: so-called spin locks and so-called semaphore locks.

The spin locks are simple software locks of one holder, which are actively polled by software until the lock is opened. The spin lock can be formed, for example, by a variable which is stored in a memory and whose status is tested by software. If the polling by a process requiring a resource gives 1 as the value for the variable, then the resource protected by the spin lock in question is already used by another process and the process requiring the resource will continue to poll the lock. When 0 is obtained as the value for the variable in the polling, the resource in question is thus detected to be vacant and the process requiring the resource will set 1 as the value for the variable of the lock and itself as the user of the critical region. When terminating the use of the resource, the process will exit the critical region and write 0 as the value of the variable of the lock again.

A software semaphore lock, in turn, may have several holders; in other words, there may be several "keyholes" in the semaphore lock, and the number of the keyholes is determined when the lock is initialized. Consequently, several processes may have access to the same resource protected by the semaphore lock. If the semaphore controlling the use of a given resource is not vacant, the process requiring the use of the resource will continue to poll the lock until a keyhole of the semaphore lock is released and the process has thus access to the resource protected by the lock. When the lock is busy, it is also possible to place a process requiring the use of the resource protected by the lock in a so-called reservation queue, from which reservation queue the process is woken up by the operating system when the lock is released. The operating system will detect the release of the lock by polling the lock. If the number of holders of the semaphore lock is initialized to one, the operation of the semaphore lock corresponds substantially to the operation of the spin lock.

The implementation of software spin locks and semaphore locks will typically require the use of atomic operations in the critical regions of the program code related to the control of the lock. In other words, the system must be capable of securing that no other process can modify the state of the lock while the first process is first polling the state of the lock and then changing the state of the lock to reserve the resource to its own use. Consequently, all the processors in the system, as well as the bus protocols connecting the processors with a memory, and other interfaces must support the atomic read/write sequence. However, this requirement is not fulfilled in all environments using parallel processes, wherein it restricts significantly the use of software locks in the management of parallel processes.

Furthermore, when software locks are used in multi-processor systems, it is also necessary to determine the way of implementing the lock as well as its location in the (shared) memory space of the system. Moreover, a lock placed in the memory, that is, in practice, a given variable, cannot actively inform the process that the requested resource has been released for use. However, the process requiring the resource or the operating system itself must actively poll the state of the lock/variable in question to obtain this information, wherein the processor performing this task is tied to this task and cannot take care of other possible tasks while waiting for the release of the resource.

As to the prior art relating to software locks, U.S. Pat. No. 6,263,425 also discloses a hardware semaphore circuit, by means of which a semaphore lock can be implemented in a multi-processor environment. The aim of the solution described in this publication is to alleviate the requirements set for processors of the system in relation to atomic read/write sequences when using the semaphore lock.

The solution described in U.S. Pat. No. 6,263,425 is based on the use of a single-bit semaphore comprising, for each processor, a separate port through which the semaphore is used. With the value 0 of the single-bit semaphore, the resource in question is vacant, and correspondingly, the resource is busy with the semaphore value 1. In a contention situation, the operation of this semaphore is based on the fact that when a given process tries to reserve the resource for its use by writing the value 1 for the Set.i bit in the semaphore port, the semaphore circuit will simultaneously set the value of the semaphore preceding the moment of writing as the value for the Test.i bit in the port. In other words, when the process attempting to make a reservation now reads the value of the Test.i bit in the port of the semaphore, the value 1 of the Test.i bit indicates that the resource was busy already before the write attempt, and the locking was unsuccessful. If the value of the Test.i bit is 0, this indicates that the resource was vacant at the moment of writing the Set.i bit, wherein the locking was successful. The solution presented in U.S. Pat. No. 6,263,425 makes it possible to use the semaphore lock also in such an environment, in which the processors or bus solutions as such do not guarantee access to atomic read/write sequences.

SUMMARY OF THE INVENTION

It is an aim of the present invention to provide a more sophisticated solution for a software semaphore which is suitable for multi-processor systems and which makes it simpler to reserve shared resources in a system in situations of contention between different processes.

According to the invention, a critical program region related to the management of the semaphore is integrated in a semaphore module comprising a hardware semaphore lock or several semaphore locks, wherein some of the functions of the semaphore can be implemented by logic circuits. The semaphore module according to the invention is preferably shared by several or all processors in the system.

The basic idea of the invention is that within the semaphore module, each semaphore lock is implemented in such a way that the reservation of the lock by a process requiring a resource is effected by one read operation only, wherein the process can reserve a specific semaphore lock by clearly simpler measures than in solutions of prior art. The reservation of the semaphore lock by using only one read operation will secure that in a contention situation the lock is reserved in one atomic operation by the process, wherein the processors or bus solutions used in the system as such do not need to support actual atomic read/write sequences. Within the semaphore module, the read operation will automatically induce some functions related to the reservation of the lock and implemented by logic circuits.

A single semaphore lock according to the invention may contain several keyholes; in other words, several processes may act as holders of the semaphore lock and have access to the resources protected by the lock at the same time. The number of keyholes contained in the semaphore lock, as well as the shared resource protected by the lock, can be determined by software, which makes the lock and the semaphore module very flexible to use.

Another significant advantage of the semaphore lock contained in the semaphore module according to the invention is the fact that the hardware semaphore lock can use an interrupt signal to inform the system that there is at least one vacant keyhole in the semaphore lock. This will eliminate the need to monitor the status of the semaphore lock by software polling which consumes the resources of the system.

The invention is particularly applicable in multi-processor and multi-run systems applied in modern mobile communication systems. In such environments, the invention makes it possible to dynamically allocate shared resources, such as for example memory, communication ports, or hardware accelerators, between processes requiring them.

Thanks to the invention, it will not be necessary to implement the systems in such a way that, within the system, all hardware modules and bus protocols should support atomic read/write operations. Also, the hardware semaphore function allows more degrees of freedom in the design of the system than locks implemented by software. Furthermore, the performance of the system is improved, as the processors running the processes may reserve resources required by them in a more flexible way than in prior art.

The following, more detailed description of the invention with examples will more clearly illustrate, for anyone skilled in the art, advantageous embodiments of the invention as well as advantages to be achieved with the invention in relation to prior art.

DESCRIPTION OF THE DRAWINGS

In the following, the invention will be described with reference to the appended figures, in which.

DETAILED DESCRIPTION OF THE INVENTION

Figure 1:
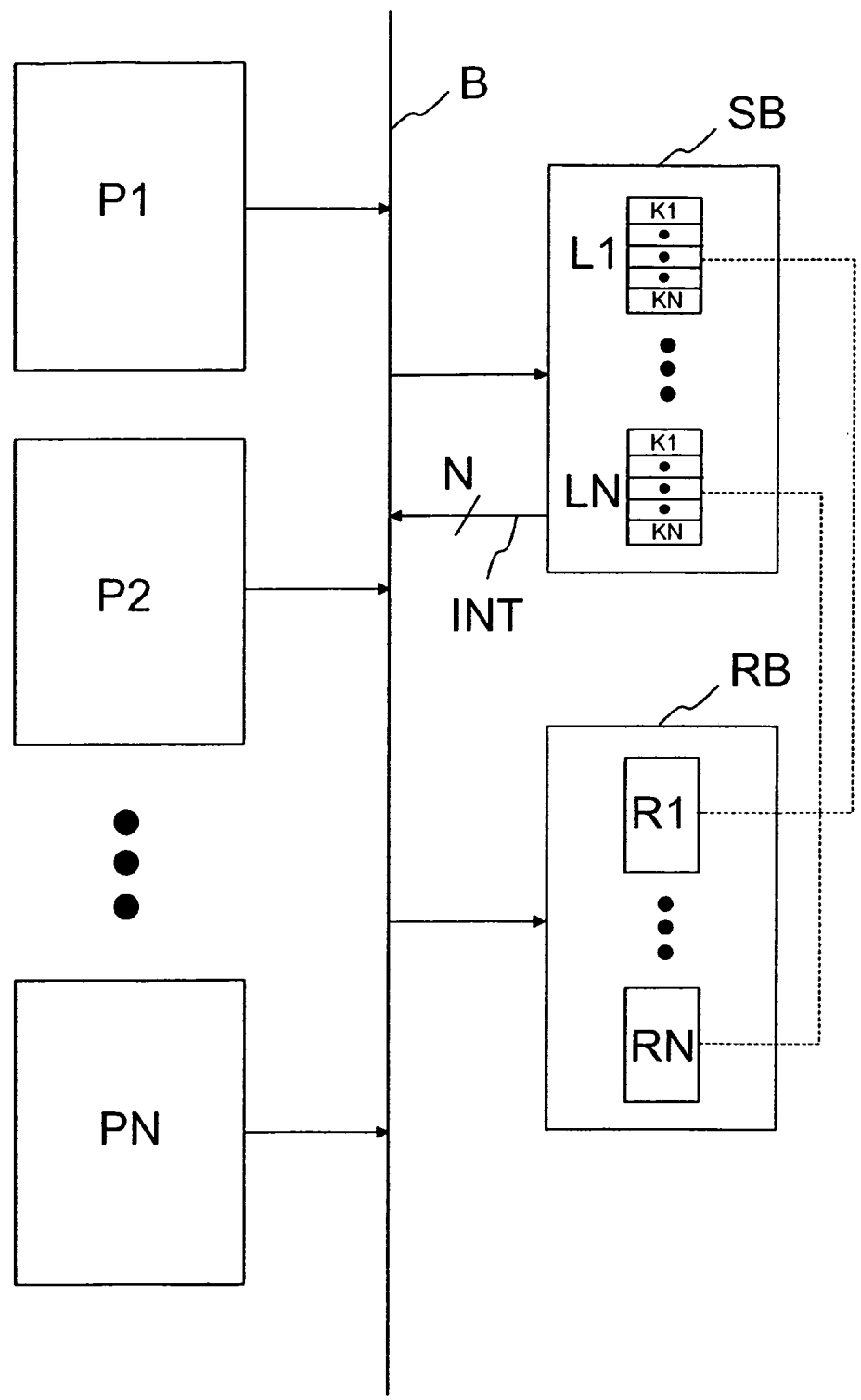
FIG. 1 shows, a hardware semaphore module according to the invention in connection with a multi-processor system.

In FIG. 1, a hardware semaphore module SB, or a semaphore circuit, is connected by a bus B to communicate with processors P1–PN. The shared resources of the system, used by the processors P1–PN, are illustrated on the general level by a block RB.

The semaphore module SB comprises one or more semaphore locks L1–LN. A single semaphore lock may further comprise one or more keyholes K1–KN; in other words, the semaphore lock may have one or more holders.

Further, a given semaphore lock L1–LN is defined to protect a given shared resource R1–RN of the system, wherein the single resource can only be used by a process which has become a holder of the semaphore lock by reserving the lock. This distinction between the semaphore locks L1–LN and the resources R1–RN is illustrated by broken lines in FIG. 1. The semaphore locks L1–LN and the shared resources R1–RN of the system are not connected to each other in a fixed manner on the hardware level, but the states of ownership between them can be freely defined by software. The resources R1–RN do not necessarily represent any physical block in the system, but the semaphore locks L1–LN can, if necessary, also be used for the management of resources R1–RN implemented purely by software.

The number of semaphore locks L1–LN in the semaphore module SB can be freely selected by software each time, and similarly, the number of keyholes K1–KN in each semaphore lock L1–LN can be selected as desired when initializing the lock. When the number of keyholes is initialized to be one, the semaphore lock will substantially operate as a spin lock of one holder.

A single semaphore lock L1–LN is visible to the system utilizing it (to the processors P1–PN) as a memory location $L1_M$–$LN_M$ in a memory space (not shown in FIG. 1), wherein the value of the memory location indicates the number of keyholes vacant in the single semaphore lock at the time.

The semaphore lock, for example the lock L1, can be initialized by the operating system by writing the maximum number KN of holders, i.e. keyholes, allowed for the lock in the corresponding memory location $L1_M$.

According to the invention, a given semaphore lock, for example lock L1, is reserved for example by the processor P1 (or by a process running in the processor) simply by reading, in a single read operation, the content of the memory location $L1_M$ corresponding to the lock L1 in the semaphore module SB. This is illustrated by means of a flow chart in FIG. 2.

The read operation (block 20 in FIG. 2) returns to the processor P1 reserving the resource the current value of the memory location $L1_M$, which can be anything from 0 to KN. If the value of the memory location $L1_M$ returned by the read operation of the processor P1 (block 20) was greater than zero (block 21), the reserve operation was successful (block 22) and the processor P1 knows that it has access to the resource R1 protected by the semaphore lock L1.

If the read operation returns zero as the value of the memory location $L1_M$ to the processor P1, all the keyholes of the semaphore lock L1 were already in use before the reserve operation, in which case the reservation was not successful (block 23).

According to the basic principle of the invention, the value of the memory location $LM_1$ in the semaphore module SB is arranged to be always reduced by one (block 24) by the internal logics of the semaphore module SB as a result of one read operation by the processor P1, if the value of the memory location $L1_M$ was greater than zero at the time of the read operation. If the value of the memory location $L1_M$ was already zero at the time of the read operation, it will also remain zero after the read operation.

Figure 2:
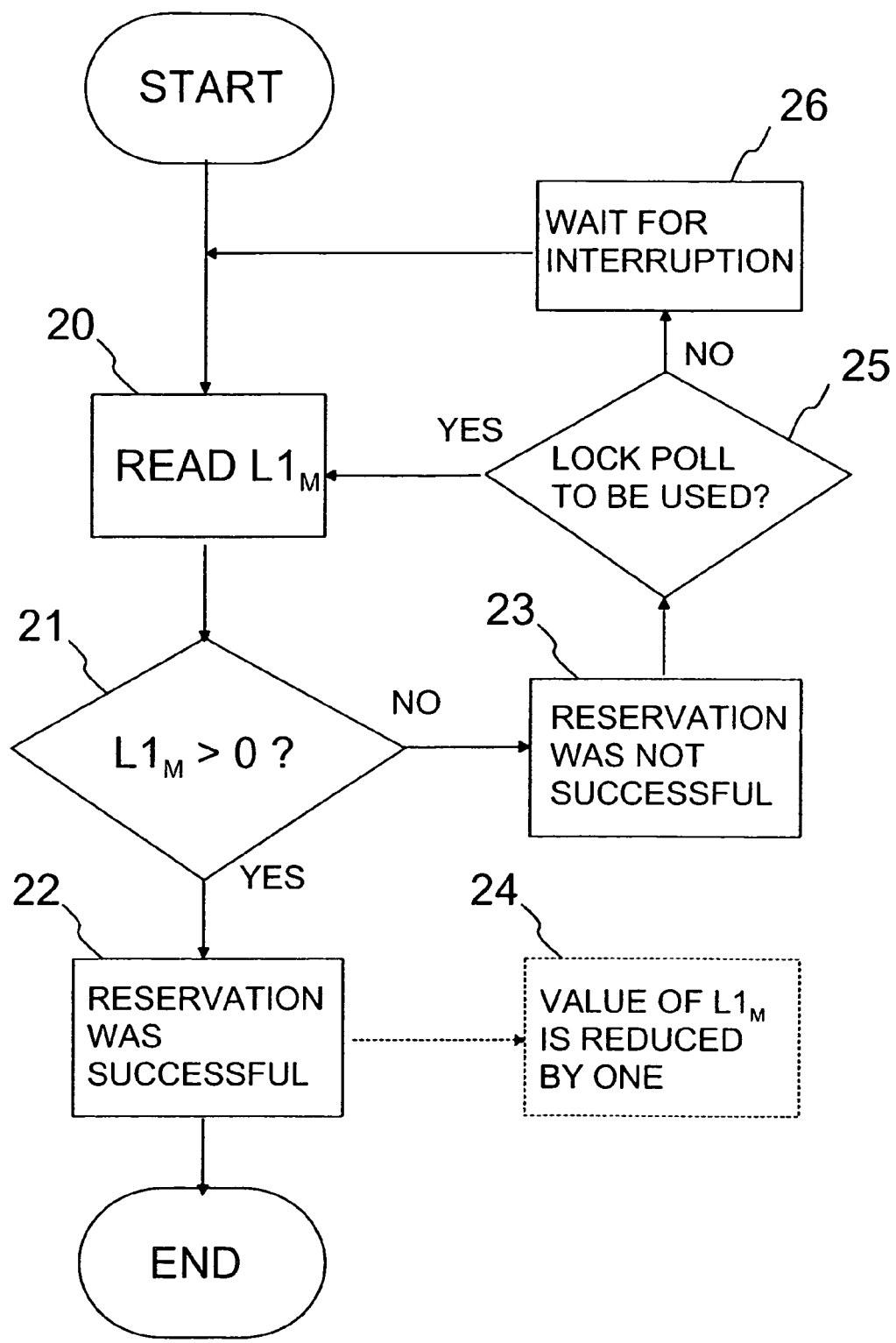
FIG. 2 shows, in a flow chart, the reservation of a single semaphore lock by the method according to the invention.

In the flow chart of FIG. 2, the block 24 is indicated with a broken line to point out that essential feature of the invention that the operations of the block 24 are arranged to take place automatically by means of hardware logics within the semaphore module SB as a result of a read operation by the processor P1 in the memory location $LM_1$ representing the semaphore lock L1.

Consequently, the semaphore lock L1 implemented according to the invention can be reserved merely by a single read operation by the processor P1, wherein a given process can have access to the semaphore lock L1 in a clearly simpler way than in solutions of prior art and wherein the system does not need to support actual atomic read/write operations. Atomic operations will not be necessary, because only one read operation is used in the invention to reserve the semaphore lock. The reservation of the semaphore lock according to the invention, based on the use of a single read operation, can be applied in such a way that processes requiring a resource protected by the lock poll the lock (block 25 in FIG. 2) by the read operation until they own the lock. In an advantageous embodiment of the invention (block 26), however, the operation of the semaphore module SB is arranged in such a way that the semaphore locks L1–LN can use an interrupt signal to inform when there is at least one keyhole vacant in a given semaphore lock. This will release the processes, which are waiting for the release of a given semaphore lock, to perform other functions instead of polling the lock to be released.

When the semaphore module SB uses the interrupt to inform the system about the release of a given resource (a vacant keyhole in a given semaphore lock L1–LN), the first process requiring the resource will reserve the resource for its use. If the interrupt caused requests by several processes to reserve the resource, then the slower processes will remain waiting for the next release of the lock. The semaphore module SB itself does not need to select the process, to which the released resource is allocated, but the lock can be allocated to the first process after the release of the lock.

For the transmission of the interrupt signal to the processors P1–PN, one or more parallel interrupt lines INT can be used in the semaphore module SB. In the embodiment of FIG. 1, N number of parallel interrupt lines INT are used. However, the number of interrupt lines INT does not necessarily need to correspond to the number of semaphore locks L1–LN included in the semaphore module SB.

The process having control over the semaphore lock L1 (one keyhole of the lock) may release the semaphore lock L1 by writing a suitable value, for example a negative value, in the memory location $L1_M$, this value being out of the range of values allowed for the semaphore lock (0 to KN). As a result, the value of the memory location $L1_M$ will be increased by one by the internal logics of the semaphore module SB. If the value of the memory location $L1_M$ before the write operation was already the allowed maximum number KN of holders, the value of the memory location will not be changed. The semaphore lock L1 can also be released by other methods obvious for a man skilled in the art, because the semaphore lock can only be released by a holder of the lock in question, and the release thus does not involve a contention situation similar to the reserve situation.

On the level of the operating system, it is further possible, if necessary, to apply software to construct reservation queues on "top" of the semaphore lock according to the invention. The processes requesting a resource controlled by the semaphore are placed in the queues, for example, in the order of reservation. The reservation queue may, in principle, contain an unlimited number of processes requiring access to a given resource. By means of reservation queues, the operating system can, if necessary, control the order, in which certain processes requiring the resource can use the resource.

The operating system can provide the semaphore module SB with a number of semaphore locks L1–LN required at the time and determine a desired number of keyholes K1–KN for each. Furthermore, a single semaphore lock can be allocated to protect a desired shared resource R1–RN.

The invention is suitable for use, for example, in a situation in which several processors are implemented on an application specific integrated circuit (ASIC), these processors utilizing shared resources on the same ASIC. Thus, the semaphore module according to the invention is also preferably implemented on the same ASIC. On the other hand, the invention can also be applied in multi-processor systems, in which the single processors are located on completely different circuit components, wherein the semaphore module according to the invention can also be located on a different circuit component than the processors.

Furthermore, the invention is also suitable for use in a situation, in which parallel software processes are being run in a single processor, wherein there is contention between the processes.

By combining the modes and system structures presented in connection with the above embodiments of the invention, it is possible to provide various embodiments of the invention which comply with the spirit of the invention. Therefore, the above-presented examples must not be interpreted as restrictive to the invention, but the embodiments of the invention can be freely varied within the scope of the inventive features presented in the claims herein below.

What is claimed is:

1. A hardware semaphore lock intended for a multi-processor system having an operating system, being configured to:
    protect a shared resource in connection with said multi-processor system;
    reserve a semaphore lock at a memory location representing the semaphore lock; and
    simultaneously return a number of holder positions, representing a number of keyholes, that are vacant at the time of reservation of said semaphore lock, wherein an allowed maximum number of vacant holder positions is arranged to be initialized in the semaphore lock by the operating system of the multi-processor system.

2. The hardware semaphore lock according to claim 1, wherein when reserving a semaphore lock, the number of vacant holder positions in the semaphore lock are arranged to be reduced by one on a hardware basis.

3. The hardware semaphore lock according to claim 1, wherein the semaphore lock is arranged to use an interrupt signal to inform the system about the release of the resource protected by it.

4. The hardware semaphore lock according to claim 1, wherein the shared resource protected by the semaphore lock is arranged to be associated with said semaphore lock by the operating system.

5. A hardware semaphore module intended for a multi-processor system, wherein several semaphore locks according to claim 1 are implemented in said semaphore module.

6. The semaphore module according to claim 4, wherein said semaphore module is placed in a multi-processor system implemented with one application specific integrated circuit.

7. The semaphore module according to claim 4, wherein said semaphore module is placed in a multi-processor system, in which individual processors are placed on a plurality of separate circuit components.

8. An apparatus comprising:
    a hardware semaphore lock intended for a multi-processor system having an operating system, said hardware semaphore lock configured to:
    protect a shared resource in connection with said multi-processor system;
    reserve a semaphore lock at a memory location representing the semaphore lock; and
    simultaneously return a number of holder positions, representing a number of keyholes, that are vacant at a time of reservation of said semaphore lock, wherein an allowed maximum number of vacant holder positions is arranged to be initialized in the semaphore lock by the operating system of the multi-processor system.

9. The apparatus according to claim 8, wherein when reserving a semaphore lock, the number of vacant holder positions in the semaphore lock are arranged to be reduced by one on a hardware basis.

10. The apparatus according to claim 8, wherein the semaphore lock is arranged to use an interrupt signal to inform the system about the release of the resource protected by the semaphore lock.

11. The apparatus according to claim 8, wherein the shared resource protected by the semaphore lock is arranged to be associated with said semaphore lock by the operating system.

12. A hardware semaphore module intended for a multi-processor system, wherein several semaphore locks according to claim 8 are implemented in said semaphore module.

13. The semaphore module according to claim 12, wherein said semaphore module is placed in a multi-processor system implemented with one application specific integrated circuit (ASIC).

14. The semaphore module according to claim 12, wherein said semaphore module is placed in a multi-processor system, in which individual processors are placed on a plurality of separate circuit components.

15. An apparatus comprising:
    means for protecting a shared resource in connection with a multi-processor system;
    means for reserving a semaphore lock at a memory location representing the semaphore lock; and
    means for simultaneously returning a number of holder positions, representing a number of keyholes, that are vacant at a time of reservation of said semaphore lock, wherein an allowed maximum number of vacant holder positions is arranged to be initialized in the semaphore lock by the operating system of the multi-processor system.

16. The apparatus according to claim 15, wherein the means for receiving a semaphore lock is arranged to use an interrupt signal to inform the system about the release of the resource protected by the semaphore lock.

* * * * *